United States Patent
Zauner et al.

(10) Patent No.: US 6,930,280 B2
(45) Date of Patent: Aug. 16, 2005

(54) METHOD FOR THE CONTROL AND/OR REGULATION OF A WELDING PROCESS

(75) Inventors: Michael Zauner, Alkoven (AT); Alfred Hiesmayr, Sattledt (AT)

(73) Assignee: Fronius International GmbH, Pettenbach (AT)

( * ) Notice: Subject to any disclaimer, the term of this patent is extended or adjusted under 35 U.S.C. 154(b) by 151 days.

(21) Appl. No.: 10/399,422

(22) PCT Filed: Oct. 5, 2001

(86) PCT No.: PCT/AT01/00321

§ 371 (c)(1),
(2), (4) Date: Apr. 17, 2003

(87) PCT Pub. No.: WO02/32610

PCT Pub. Date: Apr. 25, 2002

(65) Prior Publication Data

US 2004/0020907 A1 Feb. 5, 2004

(30) Foreign Application Priority Data

Oct. 17, 2000 (AT) .................................. A 1784/2000

(51) Int. Cl.⁷ ................................................ B23K 9/10
(52) U.S. Cl. .................................... 219/132; 219/130.5
(58) Field of Search ............................ 219/132, 130.5, 219/130.31, 130.32, 130.33, 124.34

(56) References Cited

U.S. PATENT DOCUMENTS

| | | | |
|---|---|---|---|
| 2,424,324 A | 7/1947 | Murcek et al. | |
| 4,093,844 A | 6/1978 | Fellure et al. | |
| 4,100,390 A | 7/1978 | Jackson | |
| 5,278,390 A | 1/1994 | Blankenship | |
| 5,343,016 A * | 8/1994 | Davis et al. | 219/130.5 |
| 5,739,912 A * | 4/1998 | Ishii | 219/124.34 |
| 6,096,994 A * | 8/2000 | Handa et al. | 219/130.5 |
| 6,167,328 A * | 12/2000 | Takaoka et al. | 700/264 |

FOREIGN PATENT DOCUMENTS

| | | | |
|---|---|---|---|
| DE | 3025037 | | 1/1982 |
| DE | 9301390 | | 4/1993 |
| DE | 19733638 | | 2/1999 |
| EP | 0732167 | | 9/1996 |
| EP | 0901865 | | 3/1999 |
| GB | 1574190 | | 9/1980 |
| JP | 57168770 | | 10/1982 |
| JP | 59183975 | | 10/1984 |
| JP | 63-286276 A | * | 11/1988 |
| WO | 9958286 | | 11/1999 |

* cited by examiner

Primary Examiner—Clifford C. Shaw
(74) Attorney, Agent, or Firm—Collard & Roe, P.C.

(57) ABSTRACT

The invention describes a method of controlling and/or regulating a welding process, whereby, when an arc (15) has been ignited, a set welding process based on several different welding parameters is run. The welding process is controlled and/or regulated by a control system (4) and/or a welding current source (2). The welding apparatus (1) is switched during the welding process and is switched in particular between operating states and/or functions and/or operating modes and/or welding parameters and/or welding programmes by means of a defined movement of the welding torch.

21 Claims, 4 Drawing Sheets

METHOD FOR THE CONTROL AND/OR REGULATION OF A WELDING PROCESS

Applicants claim priority under 35 U.S.C. §119 of Austrian Application No. A1784/2000 filed on Oct. 17, 2000. Applicants also claim priority under 35 U.S.C. §365 of PCT/AT01/00321 filed on Oct. 5, 2001. The international application under PCT article 21(2) was not published in English.

The invention relates to a method of controlling and/or regulating a welding process and a method of setting up a welding apparatus, of the type outlined in the generic parts of claims 1, 2 and 14, as well as welding apparatus with a welding current source, a control system and a welding torch, of the type outlined in the generic part of claim 19.

Welding apparatus is already known, in which the welding apparatus can be switched during a welding process and, to this end, a switch element, such as a torch button, has to be activated in order to switch the welding apparatus.

Other welding apparatus is known, in which different welding parameters and/or operating modes can be up for a welding process from an input and/or output device. The input and/or output device has at least one button for the operating modes and a dial indicator for the desired values, with one or more display elements, such as a light-emitting diode, and the settings are transferred from the input and/or output device to a control system, which runs a welding process accordingly. The disadvantage of this approach is that at least one key or a dial indicator has to be provided for every possible setting of the welding apparatus.

For example, a method and a device for controlling and/or regulating a welding process is known from U.S. Pat. No. 2,424,324 A, the purpose of which is to prevent the weld seam from assuming a crater-shaped appearance on termination of the welding process at the workpiece. Accordingly, the welding current is controlled in such a way that it is automatically reduced before the arc is extinguished. This is done in such a way that as the electrode is moved away from the workpiece, the arc resistance increases, thereby reducing the welding voltage. If the welding voltage falls below a specific value, the welding current is reduced to a lower value. The disadvantage of this approach is that if the welding torch is moved away from the workpiece too quickly, the arc is extinguished before a controlled reduction of the welding current can be applied.

A method and a device for controlling a welding apparatus are known from DE 197 33 638 A, whereby a plurality of parameters and operating variables are varied by at least one actuator means. When the actuator means on the welding apparatus is in an operating position, a first signal is continuously varied and in a second operating position at least one switching signal is generated. The parameters of the welding procedure are indicated on a display and a trigger signal or confirmation signal can be generated by means of the switching signal in order to activate the parameter or switch to other parameters. The disadvantage of this approach is that in order to change the welding parameter, the user has to enter these settings on the welding apparatus and must interrupt the welding process for this purpose. In welding apparatus of this type, the individual settings are entered before starting the welding process and once the arc has been ignited, the welding process, in particular the welding voltage and/or the welding current, is automatically applied in accordance with the set parameters and there is no way of changing the parameters during the welding process.

U.S. Pat. No. 4,093,844 A also discloses a welding apparatus, in which an optical system is provided for detecting the distance between the welding torch and the workpiece.

Another welding apparatus is known from DE 93 01 390 U, in which a display area is provided on the operating interface and has a plurality of different, electronically controlled display positions for different functions of the welding apparatus. A first operating element for selecting functions is used to select the display position to be set and the value to be set is changed by means of a second operating element for setting up the display. The disadvantage of this approach is that a separate display position is necessary for all the setting options, which means that only the most commonly needed parameters can be provided on the operating interface in order to keep the overall design layout clear.

The underlying objective of the invention is to propose a method of controlling and/or regulating a welding process, and a method of setting up a welding apparatus, whereby the welding apparatus can be switched during a welding process without having to operate a switch element, and the options for entering settings and handling the welding apparatus are improved.

This objective is achieved by the invention as a result of the features defined in the characterising part of claim 1. The advantage of this approach is that switching can be effected during the welding process by a defined motion of the welding torch, in particular with a view to switching functions and/or operating modes and/or welding parameters and/or welding programmes. The advantage of this is that switching of the welding apparatus during the welding process can be controlled on the basis of a welding parameter which can be acted on by the user, in particular merely by lifting the welding torch away from the workpiece, which simplifies the structure of the welding apparatus and welding torch and reduces the cost of their production.

Irrespective of the above, the objective of the invention is also achieved as a result of the combination of features defined in the characterising part of claim 2. The advantage of this approach is that in order to terminate the welding process without breaking the arc, a welding-end programme can be retrieved by a defined movement of the welding torch, and for the purpose of activating the welding-end programme, a welding parameter, in particular the welding or arc voltage and/or the welding current, is monitored and, when the welding parameter exceeds and/or falls below a pre-set threshold value, the welding-end programme is authorised and run. The advantage of this approach is that the welding torch can be shut down without the need for a torch button because the welding programme "end welding", in other words the programme which terminates welding, can be operated by the user during the welding process on the basis of a variable welding parameter, in particular the welding or arc voltage or the welding current, which simplifies the structure of the welding torch and reduces the cost of its production.

Other advantageous embodiments may be found in claims 3 to 13. The resultant advantages may be taken from the description.

Irrespective of the above, the objective is also achieved by the invention as described in the characterising part of claim 14, as a result of which the input and/or output device switches to at least one other welding parameter characteristic of the set operating mode if the button is operated for a defined period. This approach has the advantage of making a considerable saving on components, such as buttons, dial indicators, display elements, etc., whilst nevertheless giving the user the possibility of selecting different values for a specific welding parameter for a specific operating mode of the welding torch. Consequently, the input and/or output device for a welding apparatus is less expensive to produce and the input and/or output device can be considerably reduced in size, thereby providing a small, compact welding apparatus offering several settings options with only one button.

Other advantageous embodiments are described in claims 15 to 21. The resultant advantages may be found in the description.

Irrespective of the above, the objective is also achieved by the invention due to the features outlined in the characterising part of claim 19. The advantage of this approach is that the welding apparatus and welding torch are very simple and inexpensive to produce, and there is no need to provide a process control button on the welding torch, thereby reducing the number of wear-resistant parts on the welding torch.

Other advantageous embodiments are described in claims 20 and 21. The associated advantages may be found in the description.

The invention will be described in more detail with reference to illustrated examples of embodiments.

Of these:

FIG. 1 provides a schematic diagram of a welding machine or welding apparatus;

Figure 1:
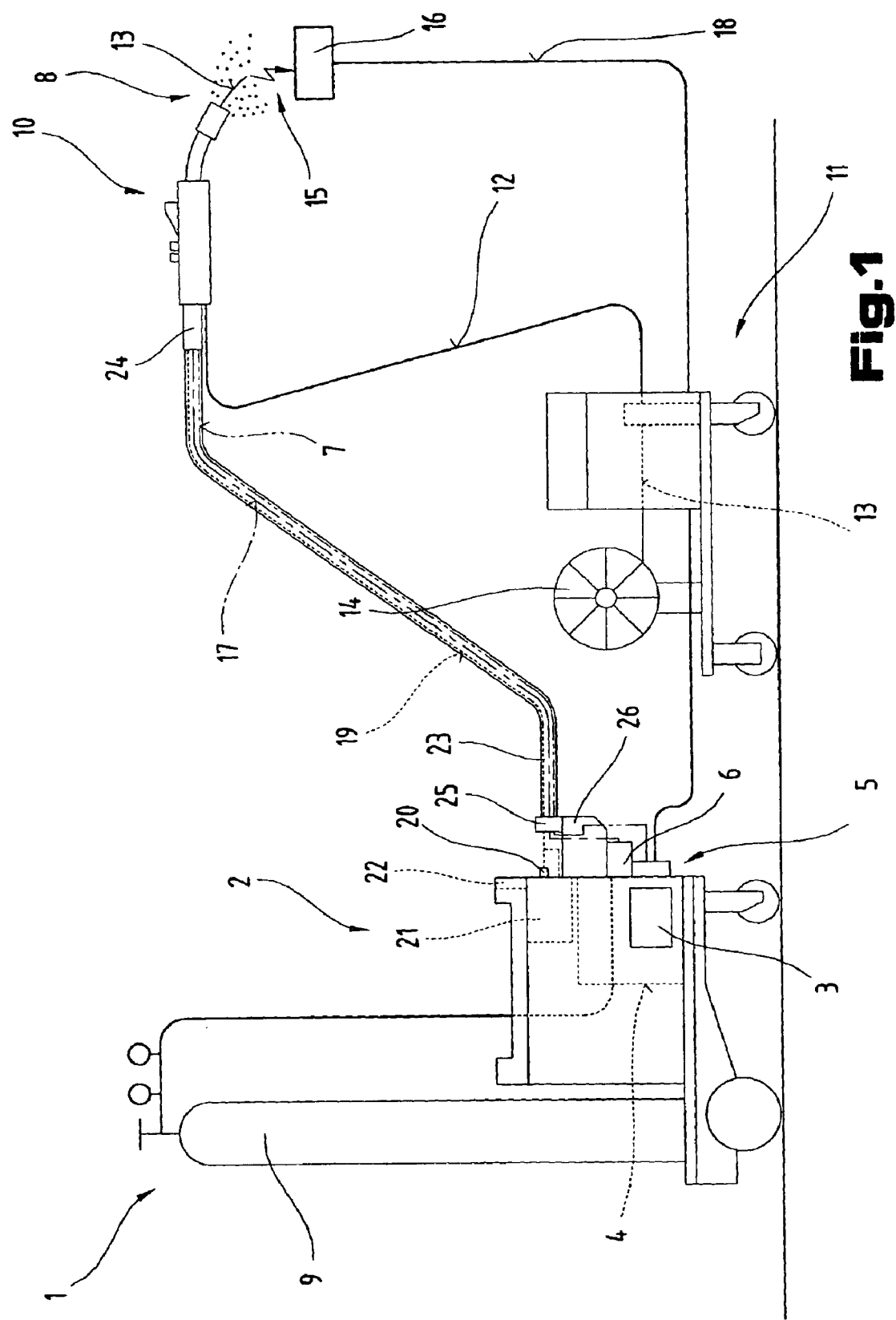

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a welding system and a welding apparatus 1 for a whole range of welding processes, e.g. MIG-MAG welding and TIG welding or electrode welding processes. Clearly, the solution proposed by the invention may be used with a current source or a welding current source.

The welding apparatus 1 has a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14 through a supply line 12 into the region of the welding torch 10. Clearly, the wire feed device 11 could also be integrated in the welding apparatus 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the current source 2 to the welding torch 10 and the welding wire 13, the workpiece 16 to be welded also being connected to the welding apparatus 1, in particular to the current source 2, via another supply line 18 so that a current circuit can be established across the arc 15 for a welding process.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled.

The welding apparatus 1 also has an input and/or output device 22, by means of which a whole range of welding parameters, operating modes or welding programmes can be set for the welding apparatus 1. The welding parameters entered at the input and/or output device 22 are then forwarded to the control system 4, from where they are applied to the individual components of the welding system and the welding apparatus 1.

In the embodiment illustrated as an example here, the welding torch 10 is also connected to the welding apparatus 1 and the welding system by means of a hose pack 23. The individual lines from the welding apparatus 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding apparatus 1 by means of connecting sockets and plug connectors. To relieve tension on the hose pack 23, the hose pack 23 is connected via a tension-relieving device 25 to a housing 26, in particular the basic housing of the welding apparatus 1.

Basically, it should be pointed out that not all the components mentioned above are necessarily employed or used for the different welding process and welding apparatus, such as WIG equipment or MIG-MAG equipment.

Figure 2:
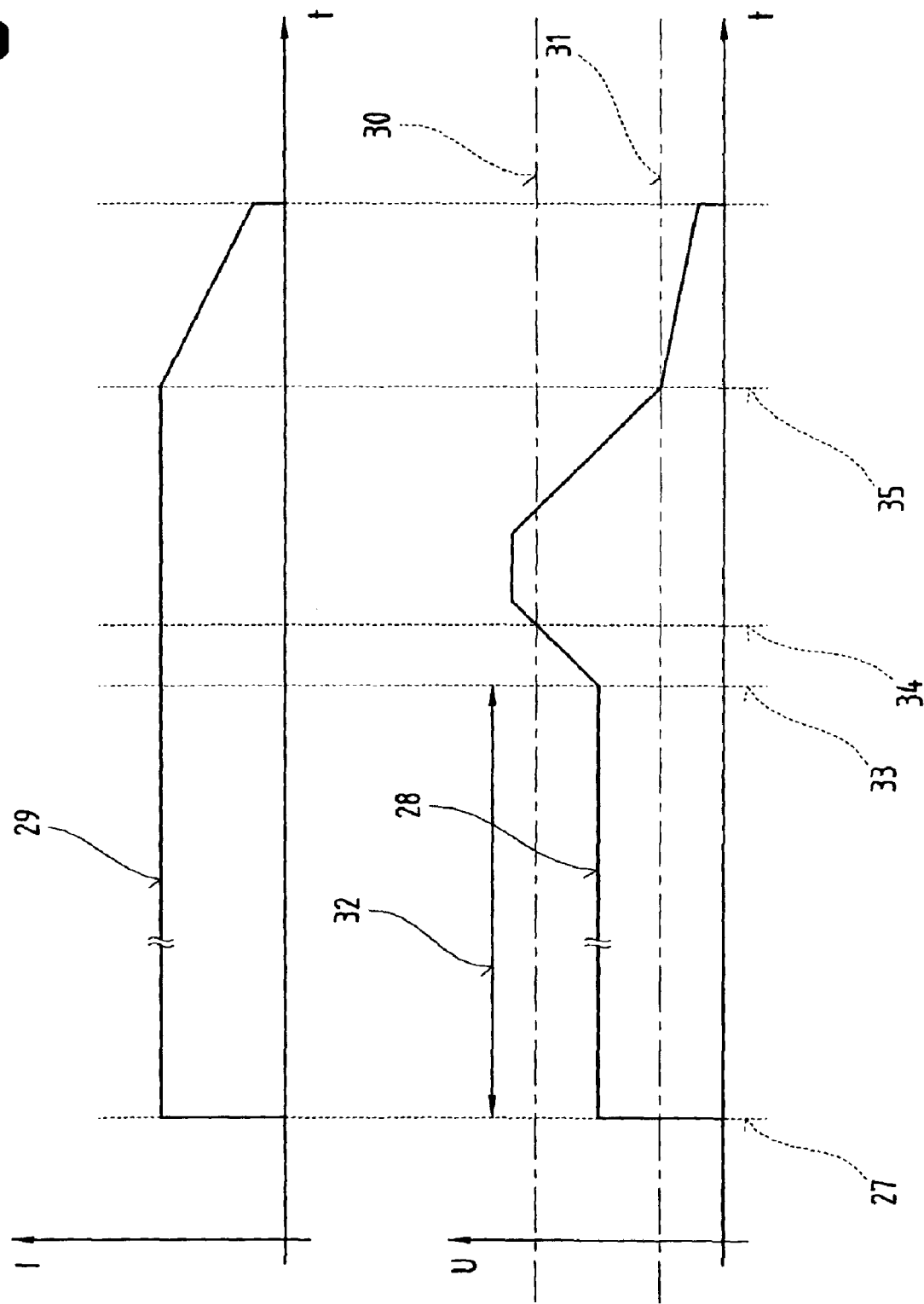
FIG. 2 is a simplified, schematic sequence diagram of a welding process operated by a welding apparatus.

FIG. 2 provides simplified diagrams of an output curve of the welding apparatus 1, in particular a WIG welding machine, for a method of controlling or regulating a welding process, the output current I being plotted on the ordinate of the first diagram and the output voltage U, synchronised in time, being plotted on the ordinate of the second diagram. Time t is plotted on the abscissa of the two diagrams.

As may be seen from a comparison of the two diagrams given in FIG. 2, a welding process is started at any instant 27, i.e. the arc 15 is ignited between the workpiece 16 and the welding wire 13, and once the arc 15 is ignited, the welding process for which settings have been entered is run. The welding process is controlled and/or regulated on the basis of the pre-set welding parameters and/or the operating mode and/or the set welding programme by means of the control system 4 and/or the welding current source 2, as is the case with standard welding apparatus known from the prior art.

In order for the welding process to be brought to a defined welding end, a welding-end programme is run, in other words what is known as a downslope, so that the essential welding parameters, such as the welding current, the welding voltage, gas delivery, etc., are terminated in a pre-set sequence, in particular the pre-defined welding-end programme, in order to shut down the arc 15, for which purpose any sequence or operating principle known from the prior art may be used and run. This type of approach, in other words a controlled termination of welding, improves the quality of the weld seam.

In order to start of the welding programme in a defined manner without operating a switch element, such as a welding torch button of the type known from the prior art, the welding-end programme is activated by monitoring the welding or arc voltage 28 and/or the welding current 29, i.e. the arc voltage at the welding torch or the output voltage from the welding apparatus 1 essentially corresponding to the arc voltage, and/or a welding current 29 is detected and the corresponding actual value forwarded to the control system 4 of the welding apparatus 1. At this stage, it should be pointed out that the welding current source 2 is essentially controlled and regulated so that the welding current 29 is constant or the welding voltage is constant, so that a pre-set constant welding current 29 or a constant welding voltage 28 always prevails at the output of the welding apparatus 1, any deviations of current or voltage from the pre-set desired current or desired voltage being corrected via the welding or arc voltage 28 or the welding current 29.

Consequently, in the embodiment illustrated as an example here, the welding-end programme can be initiated depending on the welding or arc voltage 28 and, this being the case, an upper and a lower threshold value 30, 31, schematically indicated, are fixed as a basis for activating the welding-end programme. Accordingly, threshold values 30, 31 are calculated and set by the control system 4—not illustrated in FIG. 2—for the welding or arc voltage 28 at which the welding-end programme or another sequence pattern or welding programme will be triggered, depending on the set welding process, in particular the set welding current.

Consequently, for the most varied of welding processes and operating modes, these threshold values 30, 31 are always defined, depending on whatever welding or arc voltage 28 and/or welding current 29 is set or prevails, on the basis of the set welding current 29 and/or welding or arc voltage 28, so that the range of the welding or arc voltage 28 during a pre-set welding process will always be within the two threshold values 30, 31, thereby affording a correspondingly defined tolerance.

As may be seen from the diagrams shown in FIG. 2, when the arc 15 has been ignited at the instant 27, the set welding process is started and may run for any time 32. At some other instant 33, the welding process is to be terminated, for which purpose the welding-end programme must be activated. To this end, with effect from the instant 33, the welding or arc voltage 28 is purposely raised above the upper threshold 31. This is achieved by lengthening the arc 15, in other words the welding torch 10 is purposely moved away from the workpiece 16 causing the welding current source 2 to raise the welding or arc voltage 28, so that the set welding current 29 can be kept constant even though the arc 15 has been lengthened, thereby causing the welding or arc voltage 28 to rise above the first, upper threshold value 30. This is seen at instant 34.

The fact of exceeding or reaching the upper threshold value 30, as seen at instant 34, is detected by the control system 4 by a basic desired/actual comparison between the welding or arc voltage 28 and the fixed threshold values 30, 31. The control system 4 then authorises the welding-end programme, i.e. the procedures and functions stored for the welding-end programme are uploaded. The user may continue on with the welding process without interruption, regardless of the fact that the welding-end programme has been loaded and authorised. This being the case, the welding or arc voltage 28 may be reduced to the original value again, i.e. the user moves the welding torch 10 back towards the workpiece 16, in other words to the original welding position, causing a drop in the welding or arc voltage 28. All that authorisation of the welding-end programme does is to load and activate all the procedures for terminating the welding process, enabling the welding process to be terminated at any time.

In the embodiment illustrated as an example in this instance, in order to be able to terminate the welding process in a defined manner, it is now necessary for the welding or arc voltage 28 to drop below the other, lower threshold value 31, i.e. when the welding or arc voltage 28 drops below the other threshold value 31, as may be seen at an instant 35, after which the welding-end programme is run. The user is able to control this by moving the welding torch 10 towards the workpiece 16, thereby shortening the arc 15, which prompts the welding current source 2 to reduce the welding or arc voltage 28 in order to keep the welding current 29 constant, i.e. by making the arc 15 shorter, in other words moving the welding torch 10 towards the workpiece 16, the welding or arc voltage 28 is reduced, enabling the control system 4 to detect the fact that there has been a drop below the lower threshold value 31 from a simple actual/desired comparison, as may be seen at the instant 35, whereupon the defined procedures of the welding-end programme are run. A control system of this type is possible because when the welding torch 10 is moved, the resistance for the arc 15 varies and the control system 4 and/or the welding current source 2 therefore apply an appropriate adjustment to the welding or arc voltage or welding current 29.

When the welding-end programme is run, the welding process, in particular the welding current 29, is terminated in accordance with a pre-set function or characteristic curve. Accordingly, the welding current 29 is reduced on the basis of a ramp-shaped characteristic curve. On the basis of the welding-end programme, for example, the welding current 29 can be reduced in a ramp-shaped fashion and the gas protection for the welding seam and the welding wire 13, in other words the electrode or the WIG needle, is simultaneously maintained, which makes for a significant improvement in the welding quality at the end of the welding seam.

By using two threshold values 30, 31, the user can initiate the end of the welding process early by exceeding the first threshold value 30, even though the welding process can still be continued for as long as required. Not until there is a drop below the second threshold value 31 does the control system 4 actually run the end of the welding process. This enables the workpiece 16 and the weld seam to cool slowly, thereby preventing crater formation at the end of the weld seam.

Naturally, it would also be possible to set the system up so that the welding-end programme is run already the first time there is a rise above or respectively a drop below the threshold values 30 or 31, and the method of controlling or regulating the welding process on the basis of the welding or arc voltage 28 and/or the welding current 29 is therefore not restricted to the embodiment described above. Another option would be to define only one threshold value 30 or 31 and stipulate that there must be a rise above or drop below it twice or several times, for example, before the welding-end-programme is initiated.

Using a method of this type, care should be taken to ensure that the level of the threshold values 30, 31 is defined in such a way that there can be no undesirable rise above or drop below a threshold value 30, 31 during the course of normal regulation and control of the welding process, i.e. the welding or arc voltage 28 and/or the welding current 29 is not undesirably raised above or reduced below the threshold values 30, 31 by the control system 4 or the welding current source 2 during the normal course of maintaining the welding current 28 and/or the welding or arc voltage 29 constant. One way of achieving this, for example, is to set the system up so that in order to consciously trigger and activate the system, the welding or arc voltage 28 and/or the welding current 29 must exceed or fall below the corresponding threshold value 30, 31 for a defined period of time, so that the control system 4 is prevented from detecting any brief rise above or drop below the threshold values 30, 31. This will prevent the control system 4 from inadvertently triggering or running the welding-end programme when applying adjustments or controls for the normal welding process, such as when a short-circuit occurs, for example.

Consequently, it may be said that a welding-end programme is run as a means of terminating the welding process and, in order to activate the welding-end programme, a variable welding parameter, in particular the welding or arc voltage 28 and/or the welding current 29, is monitored and the welding-end programme is triggered or run whenever the welding parameter, in particular the welding or arc voltage 28 and/or the welding current 29, goes beyond a pre-set threshold value 30, 31.

A major advantage of controlling the welding apparatus 1 in this manner at the end of the welding process is that the welding torch can be built without a torch button, since the "welding end" welding programme, in other words the welding-end programme, is activated on the basis of a welding parameter which may be acted on by the user during the welding process, in particular on the basis of the welding or arc voltage 28 and/or the arc length ad/or the welding current 29, thereby simplifying the structure of the welding torch 10 and making it less expensive to produce. The welding torch is also more convenient to handle as a result.

Figure 3:
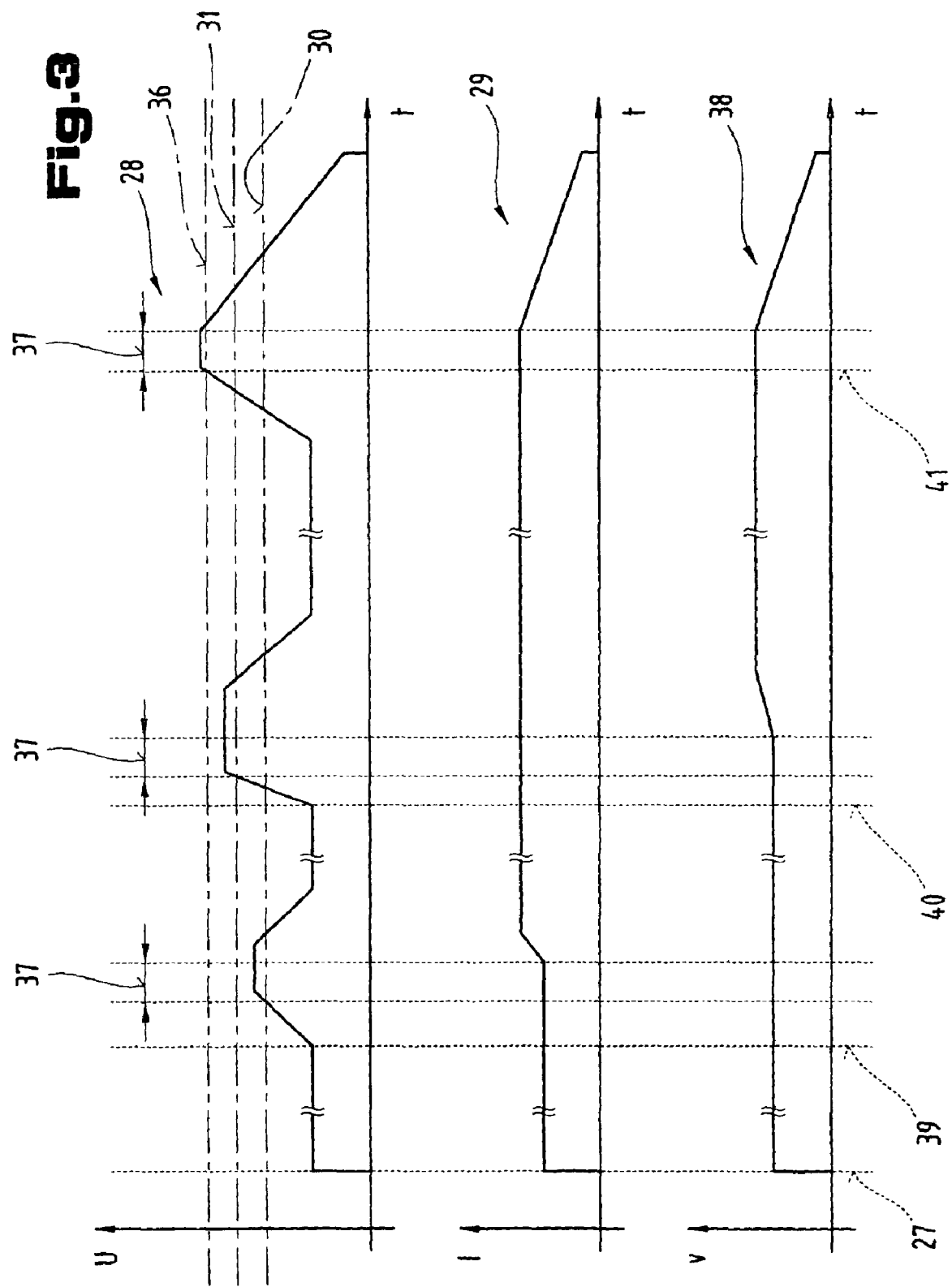
FIG. 3 is another simplified, schematic sequence diagram of another possible welding process operated by a welding apparatus.

This type of system whereby the welding apparatus 1 is controlled on the basis of a welding parameter acted on by the user, such as the welding or arc voltage 28 and/or the welding current 29, may also be used for other control functions, such as switching the welding apparatus 1 from one current value 28 to another current value 28, for example, or varying another welding parameter without interrupting the welding process, as will become evident from the embodiment described as an example below with reference to FIG. 3.

In the embodiment illustrated in FIG. 3, several, in particular three, threshold values 30, 31, 36 are fixed or defined and when there is a rise above or drop below these threshold values 30, 31, 36, several functions are run by the control system 4 without terminating the welding process, in other words without terminating the arc 15 (see FIG. 1), such as a switch from one welding current 29 to another, higher welding current 29, for example. This being the case, it would naturally also be possible to retrieve any welding parameters and run any welding programmes.

The key factor is that functions, operating modes, welding parameters or welding programmes are activated and switched by the control system 4 and/or the welding current source 2 without interrupting the welding process in progress, in other words without breaking the arc 15, for which purpose the user does not have to activate elements of any kind, such as a welding torch button, and instead the switch is made by lengthening or shortening the arc 15, in other words the arc length is controlled, i.e. the arc length and hence an associated welding parameter, in this case the welding or arc voltage 28, is consciously varied by moving the welding torch 10 away from and/or towards the workpiece 16.

By fixing several threshold values 30, 31, 36, as illustrated in FIG. 3, several different functions or procedures can be run, in which case a corresponding function or procedure is stored for each threshold value 30, 31, 36.

To this end, depending on the threshold values 30, 31, 36 available, corresponding display elements, in particular light-emitting diodes, are provided on the welding torch 10, for example, so that when a threshold value 30, 31, 36 is activated, the corresponding display element starts to light up, so that the user has a visual display of the control sequence or function switch just initiated.

As illustrated in FIG. 3, several, in particular three threshold values 30, 31, 36 are defined, the first threshold value 30 being used to switch the welding current 29, the second threshold value 31 being used to switch the wire feed rate and the third threshold value 36 being used to trigger and run the welding-end programme.

At this stage, it should be pointed out that the threshold values 30, 31, 36 in this embodiment lie above the welding or arc voltage 28 at the start of the welding process and occur at the instant 27, so that the user simply has to lift the welding torch 10 away from the workpiece 16 to select the different functions and procedures. Naturally, it would also be possible for the threshold values 30, 31, 36 to be defined so that they lie below the normal welding or arc voltage 28, e.g. after the instant 27.

As described above, when a threshold value 30, 31, 36 is exceeded, the corresponding function of a control procedure is run and an associated display element—not illustrated—on the welding torch 10 is also activated.

In the embodiment illustrated as an example here, a function or a defined control procedure is retrieved by setting the welding or arc voltage 28 so that it must be raised above a corresponding threshold value 30, 31, 36 and must be held in this range for a specified period 37, for example of 2 seconds, in order to select this threshold value 30, 31, 36. This is necessary because there are several threshold values 30, 31, 36 in this instance, which means that when the upper threshold value 36 is reached, for example, the two defined thresholds 30, 31 below also have to be exceeded at an earlier point.

To explain how this embodiment operates, the most important procedures will now be explained with reference to the diagrams of the welding process illustrated in FIG. 3, the first diagram plotting the welding or arc voltage 28, the second diagram the welding current 29 and the third diagram the wire feed rate 38.

After the start of the welding process, the user moves the welding torch 10 way from the workpiece 16 at any instant 39, which causes the welding or arc voltage 28 to rise. The user will be able to tell when the first threshold 30 was exceeded because the control system 4 activates the display elements when this value is exceeded. If the user wants to select or activate the function or control procedure associated with the first threshold value 30, the user must hold the welding torch 10 in this position for the defined time 37, which is preferably approximately 2 seconds. By additionally monitoring the time 37, the control system 4 will be able to detect that the function or control procedure associated with the first threshold value 30 should be activated, i.e. in the embodiment illustrated as an example here, the welding current 29 must be increased from a first value to another value. The user can then move the welding torch 10 back into the original position so that the welding or arc voltage 28 is reduced below the threshold value 30, thereby deactivating the display element. In this instance, if this threshold value 30 is selected twice, the welding current 29 can be returned to the original value.

For the user to be able to activate the function or control procedure associated with the second threshold value 31, the welding or arc voltage 28 must be raised accordingly again. At the instant 40, the user again moves the welding torch 10 away from the workpiece 16, which causes the welding or arc voltage 28 to rise and hence the arc length of the arc 15 to lengthen due to the change in resistance. Once the first threshold value 30 has been exceeded, the user moves the welding torch 10 away again so that the welding or arc voltage 28 is raised still further. When the welding or arc voltage 28 exceeds the second threshold value 31, the control system 4 activates the display element for the second threshold value 31, so that the user will be aware of this and can hold the welding torch 10 in this position for the time 37 needed to activate the stored function or stored control procedure, i.e. in the embodiment illustrated as an example here, when the defined time 37 has elapsed, the wire feed rate 38, for example, is increased.

If the user wishes to terminate the welding process, he must move the welding torch 10 away from the workpiece 16 again, in the fashion descried above, until the display element starts to light up for the third threshold value 36, as may be seen at the instant 41, so that when the time 37 has elapsed, the stored function, in other words the welding-end programme, is activated. The welding-end programme is activated and run at the same time as the threshold value 36 is exceeded and the welding current 29 is terminated in a ramp-type fashion whilst maintaining the protective gas atmosphere.

Controlling the welding apparatus 1 in this manner means that the user can control switching between different welding parameters, operating modes, welding programmes, etc., without operating a switching element or modifying the set-up of the welding apparatus 1 and the welding process being run at the time does not have to be interrupted or terminated, i.e. the welding apparatus 1 can be switched between functions and/or operating modes and/or welding parameters and/or welding programmes in particular, during the welding process by effecting a defined movement of the welding torch 10, without interrupting the welding process, in particular without breaking the arc 15, and a welding parameter, in particular a welding or arc voltage 28 and/or the welding current 29, is monitored for switching purposes so that the control system 4 can switch the welding apparatus 1 when the welding parameter exceeds or falls below a threshold value 30, 31, 36.

Naturally, it would be perfectly possible to store any number of threshold values 30, 31, 36. For example, the user could associate the individual threshold values 30, 31, 36 with the corresponding functions or control procedures, in which case the individual welding parameters will be set or fixed by the control system 4 prior to starting the welding process. It would also be possible to activate several functions or control procedures with one threshold value 30 or 31 or 36. This can be set up in such a way, for example, that it is necessary to go beyond the threshold value 30, 31, 36 several times with a specific timing within a pre-set time, i.e. if the value is exceeded once, for example, the first function or the first control procedure is activated, whereas if it is exceeded twice or several times the second function or the second control procedure can be selected.

Figure 4:
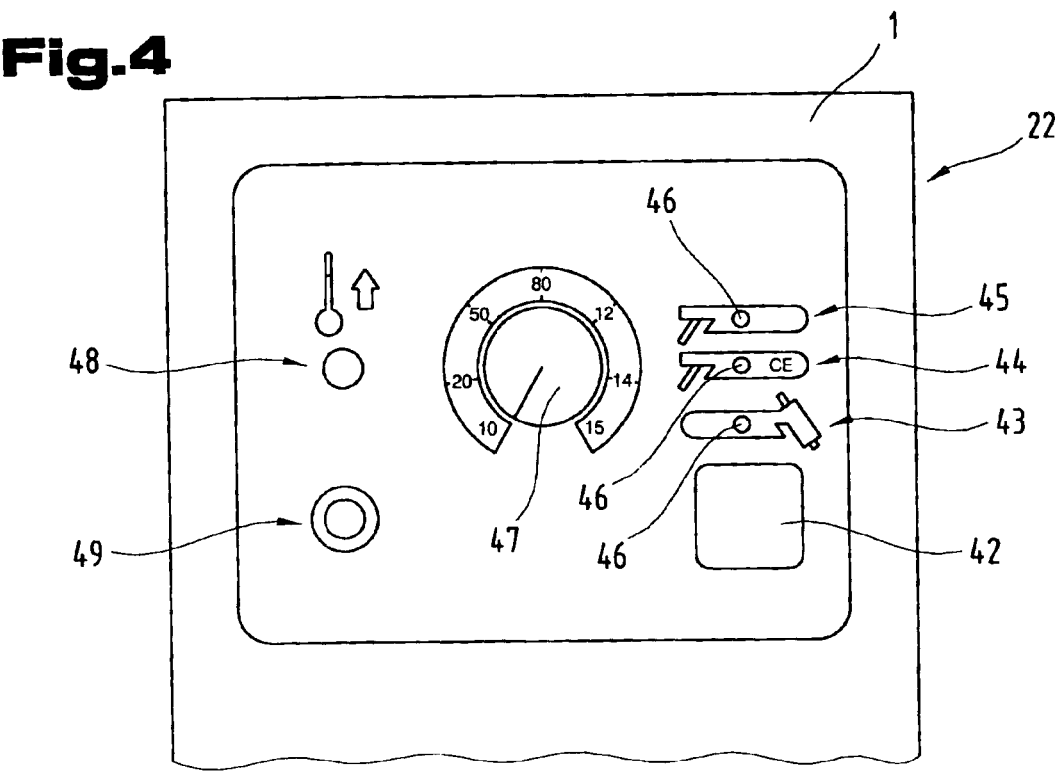
FIG. 4 is a simplified, schematic diagram showing a front view of the welding apparatus with an input and/or output device.
Figure 5:
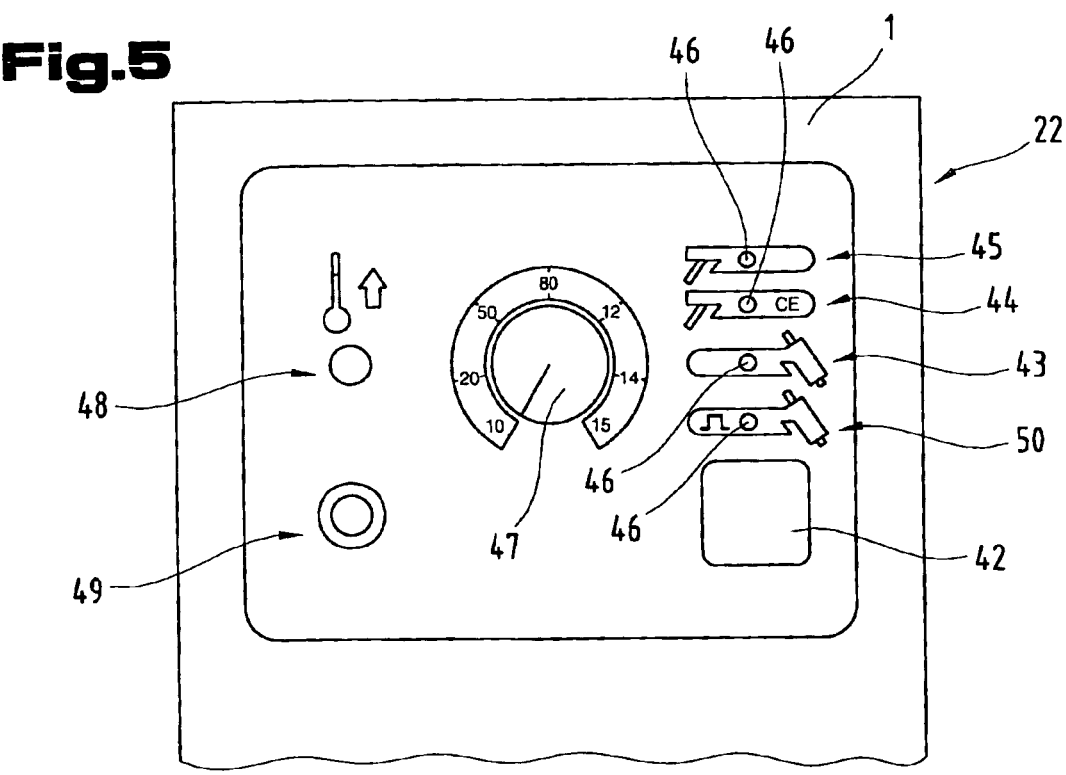
FIG. 5 is a simplified, schematic diagram showing a front view of another embodiment of the welding apparatus with an input and/or output device.

Naturally, instead of moving the welding torch 10 and the workpiece 16 away from each other on the basis of an evaluation of the welding or arc voltage and/or the welding current, as described above, it would also be possible to use an optical system for this purpose. This optical system would then be expediently disposed on the welding torch 10 and may be provided in the form of any distance-measuring system known from the prior art. The method described above can the be run by evaluating the data supplied by this optical distance-measuring system:

FIGS. 4 and 5 show a front view of the welding apparatus 1, in particular a WIG welding apparatus, the purpose being to provide a detailed illustration of two embodiments of an input and/or output device 22.

A button 42 can be used to switch between the individual operating modes, such as a WIG mode 43, a CEL mode 44 and an electrode mode 45, the individual operating modes being associated with display elements 46, for example in the form of light-emitting diodes, so that the associated light-emitting diode will start to light up depending on the selection made. The user can set a corresponding desired value by means of the rotary dial 47. The input and/or output device 22 illustrated also has a display element 48 for excess temperature and a contact 49 for the welding line 17—not illustrated in FIGS. 4 and 5.

To provide a simple and cost-effective means whereby this input and/or output device 22 can be used to set various different parameters, the single button 42 of the input and/or output device 22 illustrated in this embodiment may operate with a so-called background menu. Accordingly, when the button 42 is depressed, the user interface is switched and a characteristic value or welding parameter for the current operating mode can be adjusted, i.e. when the button 42 is operated for a defined time, the input and/or output device 22 will switch to at least one other characteristic welding parameter for a set operating mode. For example, a value or the welding parameter might represent the dynamics of the operating mode—electrode mode 43—or the slope of the prevailing characteristic curve relating to the operating mode—CEL mode 44—and in the case of the WIG mode 45 the threshold values 30, 31 to be set as described above. In the welding apparatus 1 illustrated in FIG. 5, the input and/or output device 22 has an additional operating mode—WIG pulse mode 50—and the background menu for this operating mode will also enable the pulse frequency to be adjusted, for example.

The setting and display for the corresponding value and the value for the corresponding welding parameter is not adjusted or set by means of the dial indicator 47 but is represented or determined by the display elements 46, i.e. a stored value can be selected accordingly, depending on the number of illuminated or non-illuminated display elements 46.

This may be operated so that, having switched to the so-called background menu, which is retrieved by depressing the button 42 for a longer period of approximately 2 seconds, for example, all the display elements 46 are deactivated, which will correspond to the lowest value for the welding parameter. If the button 42 continues to remain depressed or if it is now briefly operated, the individual display elements 46 will start to light up one after the other, i.e. after a defined period, the first display element 46 is illuminated, followed by the second display element 46 after another period, the individual display elements 46 being associated with different values, thereby providing a simple means of setting the welding apparatus 1. The number of activated display elements 46 will therefore provide information about the level or value of the characteristic welding parameter, i.e. in the embodiment illustrated as an example in FIG. 4, four different values can be set for each of the characteristic welding parameters of the different operating modes defined in the background, whereas in the embodiment illustrated as an example in FIG. 5, five different values are stored because of the additional operating mode. It should be pointed out that the design of the input and/or output device 22 is not restricted to the embodiments illustrated as examples here and a background menu of this type may be set up in any known input and/or output device 22.

If the operating mode—WIG mode 43—is selected, for example, the threshold values 30, 31 can be pre-set by the user. With this method of entering settings, the system can be set up so that for the first two display elements 46—in other words no display element 46 or the first display element 46 is illuminated to indicate the operating mode WIG mode 43—a corresponding respective value is stored for the upper threshold value 30, whereas for the other two options—in other words the display elements 46 are illuminated to indicate the operating mode CEL mode 44 or electrode mode 45—a respective value is stored for the lower threshold value 31. Consequently, the user can select from two different threshold values 30, 31. The threshold values 30, 31 may also be set in such a way that the two threshold values 30, 31 are adjusted simultaneously, so that both threshold values 30, 31 are shifted upwards or downwards at a defined hysteresis.

Naturally, it would also be possible to provide several display elements 46, each of which can be associated with a corresponding value. Another option would be to set up a control system for the display elements 46 in the form of a binary code so that yet other values can be stored for the characteristic welding parameters of an operating mode.

Using a settings option of this type, in other words a dual configuration of elements as it were, advantageously makes for a considerable saving on components such as buttons 42, rotary dial indicators 47, display elements 46, etc., whilst nevertheless giving the user the option of selecting different values for a specific welding parameter for a specific type of operating mode of the welding apparatus 1. Consequently, a welding apparatus 1 can be provided with a very cost-effective input and/or output device 22 and a considerable saving can also be made on the size of the input and/or output device 22, which makes for a small, compact welding apparatus 1 with a plurality of settings options using just one button 42.

However, it would also be possible for the background menu to be designed and programmed in such a way that once the background menu has been activated, in other words after depressing the button 42 for a specific time, a specific welding parameter is associated with every display element 46, by means of which the value for the different welding parameters can be set depending on the selected display element or by means of the dial indicator 47, i.e. several welding parameters can be set or adjusted for every operating mode and the new value or level of the welding parameter is set by means of the dial indicator 47.

For the sake of good order, it should be pointed out that, in order to provide a clearer understanding of the welding apparatus 1, it and its constituent parts are illustrated to a certain extent out of scale and/or on an enlarged scale and/or on a reduced scale.

The independent solutions proposed by the invention in respect of the underlying objective may be taken from the description.

Above all, the embodiments and features of the subject matter illustrated in the individual FIGS. 1; 2; 3; 4, 5 may be construed as independent solutions in their own right. The related objectives and solutions may be found in the detailed descriptions of these drawings.

| List of reference numbers | |
|---|---|
| 1 | Welding apparatus |
| 2 | Welding current source |
| 3 | Power component |
| 4 | Control system |
| 5 | Switching element |
| 6 | Control valve |
| 7 | Supply line |
| 8 | Gas |
| 9 | Gas storage |
| 10 | Welding torch |
| 11 | Wire feed device |
| 12 | Supply line |
| 13 | Welding wire |
| 14 | Supply reel |
| 15 | Arc |
| 16 | Workpiece |
| 17 | Welding line |
| 18 | Welding line |
| 19 | Coolant circuit |
| 20 | Flow indicator |
| 21 | Water container |
| 22 | Input and/or output device |
| 23 | Hose pack |
| 24 | Connecting device |
| 25 | Tension-relieving device |
| 26 | Housing |
| 27 | Instant |
| 28 | Welding or arc voltage |
| 29 | Welding current |
| 30 | Threshold value |
| 31 | Threshold value |
| 32 | Time |
| 33 | Instant |
| 34 | Instant |
| 35 | Instant |
| 35 | Threshold value |
| 36 | Time |
| 38 | Wire feed rate |
| 39 | Instant |
| 40 | Instant |
| 41 | Instant |
| 42 | Button |
| 43 | WIG mode |
| 44 | CEL mode |
| 45 | Electrode mode |
| 46 | Display element |
| 47 | Dial indicator |
| 48 | Display element |
| 49 | Contact |
| 50 | WIG pulse mode |

What is claimed is:

1. Method of controlling a welding apparatus with a welding torch, wherein, when the arc has been ignited, a set welding process based on several different welding parameters is run and the welding apparatus is controlled by a control system, and in order to initiate an action, a parameter dependent on the arc, in particular an arc voltage an arc current is monitored, characterised in that a welding-end programme is called up by a defined movement of the welding torch in order to terminate the welding process without breaking the arc, and, in order to activate the welding-end programme, a welding parameter, in particular a welding or arc voltage or the welding current, is monitored and, when a threshold value is exceeded for the first time, a welding-end programme is activated and the latter is run if there is a rise above or fall below a threshold value again.

2. Method as claimed in claim 1, characterised in that the welding apparatus is controlled without interrupting the welding process, in particular without breaking the arc.

3. Method as claimed in claim 1, characterised in that the welding-end programme is run when the welding or arc voltage falls below another threshold value.

4. Method as claimed in claim 1, characterised in that when the welding-end programme is run, the welding process, in particular the welding current, is terminated on the basis of a pre-set function or characteristic curve.

5. Method as claimed in claim 1, characterised in that the welding current is reduced in accordance with a ramp-shaped characteristic curve.

6. Method as claimed in claim 1, characterised in that the threshold values of the welding or arc voltage are calculated and fixed by the control system depending on the set welding process, in particular the set or instantaneously prevailing welding or arc voltage or the welding current.

7. Method as claimed in claim 1, characterised in that the defined movement of the welding torch involves moving it away from or closer towards the workpiece without breaking the arc.

8. Method as claimed in claim 1, characterised in that the welding or arc voltage is raised or lowered in order to switch the welding apparatus by lengthening or shortening the arc.

9. Method as claimed in claim 1, characterised in that the welding apparatus is controlled on the basis of a welding parameter which can be acted on by the user.

10. Method as claimed in claim 1, characterised in that switching between different welding parameters, operating modes and welding programmes is controlled by the user without operating a switching element or adjusting a setting of the welding apparatus and the welding process in progress at the time is not interrupted or terminated.

11. Method of setting a welding apparatus, in particular a WIG welding apparatus, in which various welding parameters or operating modes for a welding process can be entered from an input or output device, and the input or output device has at least one button for the operating modes and a dial indicator for the desired values as well as one or more display elements, such as a light-emitting diode, and the settings are transferred from the input or output device to a control system in order to run a corresponding welding process, characterised in that when the button is operated for a defined time, the input or output device is switched to at least one other characteristic welding parameter for the set operating mode so that another welding parameter is stored for a displayed welding parameter, using a double configuration-setting option.

12. Method as claimed in claim 11, characterised in that a background menu can be called up by means of the button of the input or output device.

13. Method as claimed in claim 11, characterised in that when the input or output device is switched, in particular to the background menu, a predefined value for the characteristic welding parameter is stored for every display element depending on the selected operating mode of the welding apparatus.

14. Method as claimed in claim 11, characterised in that the welding parameter is set for the dynamics in electrode mode operation, for the slope of the descending characteristic curve in cellulose electrode mode operation and for the threshold values in WIG mode operation.

15. Method as claimed in claim 11, characterised in that the display of the corresponding value or the value for the corresponding welding parameter is represented and determined by the display elements.

16. Method as claimed in claim 11, characterised in that, depending on the number of illuminated and non-illuminated display elements, a corresponding stored value is selected for the operating modes of the welding apparatus.

17. Method as claimed in claim 11, characterised in that the display elements are controlled in the form of a binary code.

18. Method as claimed in claim 11, characterised in that a specific welding parameter is assigned to every display element and the value for the different welding parameters is set by means of the dial indicator.

19. Welding apparatus with a welding current source, a control system and a welding torch, for running a method as defined in claim 1, characterised in that the control system is configured to detect a defined movement of the welding torch by reference to a workpiece.

20. Welding apparatus as claimed in claim 19, characterised in that the control system has at least one device for detecting a welding or arc voltage or a welding current.

21. Welding apparatus as claimed in claim 19, characterised in that the welding torch is provided with an optical system for detecting a distance between the welding torch and the workpiece.

* * * * *